United States Patent
McNew

(10) Patent No.: US 11,458,974 B2
(45) Date of Patent: Oct. 4, 2022

(54) FLEET-BASED AVERAGE LANE CHANGE AND DRIVER-SPECIFIC BEHAVIOR MODELLING FOR AUTONOMOUS VEHICLE LANE CHANGE OPERATION

(71) Applicant: TOYOTA MOTOR ENGINEERING & MANUFACTURING NORTH AMERICA, INC., Plano, TX (US)

(72) Inventor: John-Michael McNew, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 231 days.

(21) Appl. No.: 16/505,077

(22) Filed: Jul. 8, 2019

(65) Prior Publication Data

US 2021/0009133 A1 Jan. 14, 2021

(51) Int. Cl.

| | |
|---|---|
| *B60W 40/09* | (2012.01) |
| *G08G 1/16* | (2006.01) |
| *B60W 30/18* | (2012.01) |
| *B60W 30/095* | (2012.01) |
| *G05D 1/02* | (2020.01) |

(52) U.S. Cl.
CPC .. *B60W 30/18163* (2013.01); *B60W 30/0956* (2013.01); *B60W 40/09* (2013.01); *G05D 1/0291* (2013.01); *G08G 1/167* (2013.01); *B60W 2554/4041* (2020.02)

(58) Field of Classification Search
CPC ......... B60W 60/001; B60W 30/18163; B60W 30/0956; B60W 40/09; B60W 2554/4041; B60W 2554/4045; G05D 1/0287; G05D 1/0291; G05D 1/0295; G05D 1/0293; G05D 1/0297; G08G 1/20; G08G 1/22; G08G 1/167
See application file for complete search history.

(56) References Cited

U.S. PATENT DOCUMENTS

| | | | |
|---|---|---|---|
| 7,177,743 B2 * | 2/2007 | Roy | B60W 50/06 |
| | | | 701/36 |
| 9,096,267 B2 | 8/2015 | Mudalige | |
| 9,147,353 B1 * | 9/2015 | Slusar | G06Q 40/08 |
| 9,964,414 B2 | 5/2018 | Slavin | |
| 10,007,263 B1 | 6/2018 | Fields | |
| 10,077,056 B1 * | 9/2018 | Fields | B60W 50/0098 |
| 2014/0032015 A1 * | 1/2014 | Chun | G08G 1/166 |
| | | | 701/2 |
| 2017/0305434 A1 | 10/2017 | Ratnasingam | |

(Continued)

*Primary Examiner* — Jeff A Burke
*Assistant Examiner* — Joshua Alexander Garza
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for creating more organic lane change models for autonomous or semi-autonomous operation of a vehicle. A plurality of data associated with a plurality of driver-performed lane change maneuvers is collected from a plurality of different vehicle. Driver-performed lane change maneuvers are discarded when determined to fall outside a threshold of safety. A generic model is generated from the non-discarded data for average lane change maneuvers. Specific models can be generated for different drivers, vehicle types, and other metrics by comparison with the generic model.

20 Claims, 8 Drawing Sheets

(56) References Cited

U.S. PATENT DOCUMENTS

| | | | |
|---|---|---|---|
| 2018/0113461 A1 | 4/2018 | Potnis | |
| 2018/0263963 A1* | 9/2018 | Castro-Palomino | ......................... A61K 31/427 |
| 2019/0011931 A1* | 1/2019 | Selvam | ................... G08G 1/202 |
| 2019/0034794 A1* | 1/2019 | Ogale | ................... G05D 1/0221 |
| 2019/0102689 A1* | 4/2019 | Lassoued | ............. G07C 5/0841 |
| 2019/0147262 A1* | 5/2019 | Kuehnle | ................. G07C 5/008 340/439 |
| 2019/0171208 A1* | 6/2019 | Magalhães de Matos | ................... G05D 1/0027 |
| 2019/0187706 A1* | 6/2019 | Zhou | .................... G05D 1/0088 |
| 2020/0019174 A1* | 1/2020 | Cheriton | .............. G05D 1/0246 |
| 2020/0023839 A1* | 1/2020 | Yan | ....................... B60W 40/09 |
| 2020/0166897 A1* | 5/2020 | Campos | ................. B60R 11/04 |

\* cited by examiner

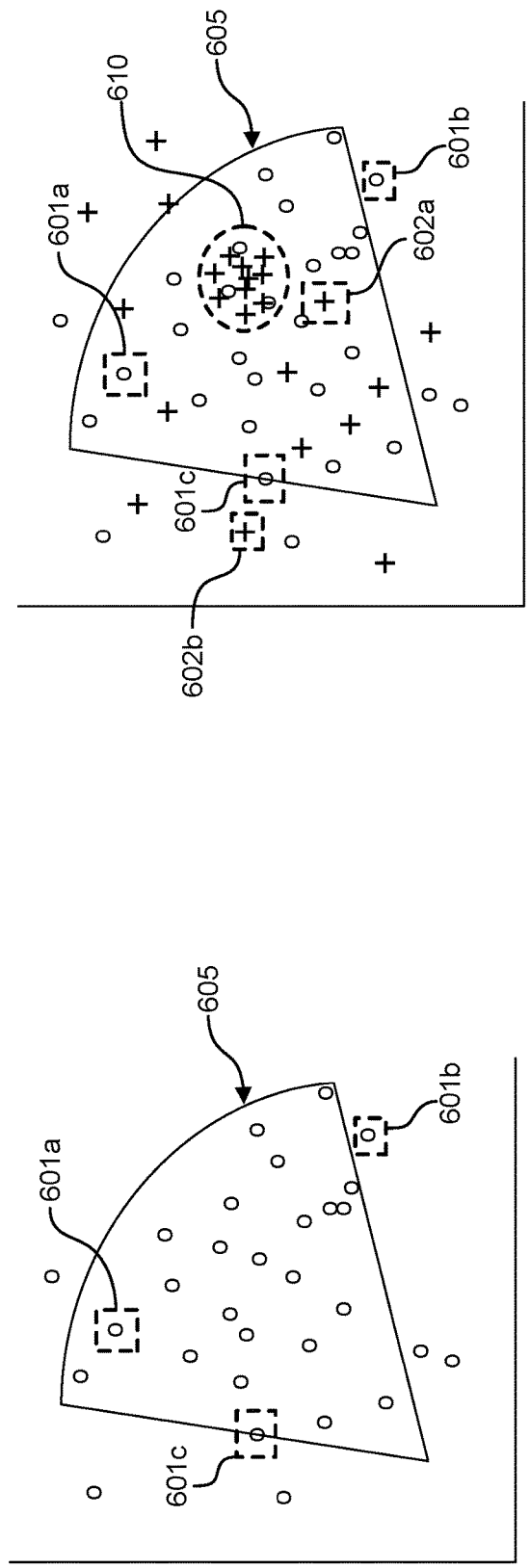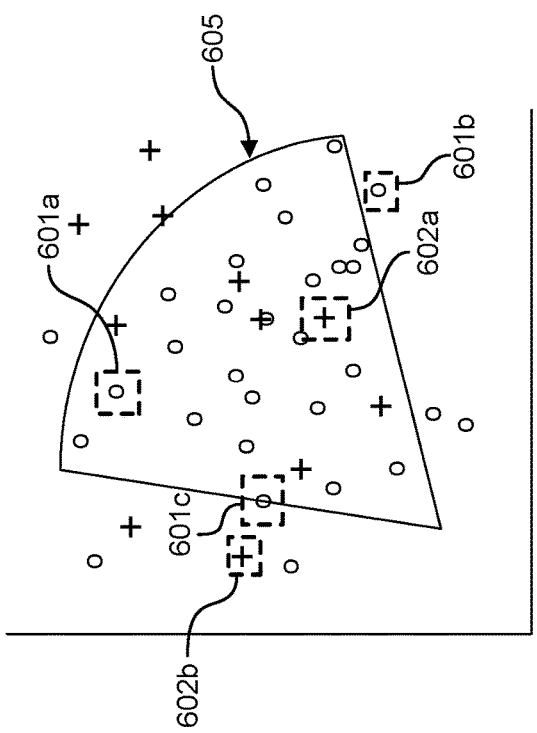
Fig. 6C
Fig. 6B
Fig. 6A

FLEET-BASED AVERAGE LANE CHANGE AND DRIVER-SPECIFIC BEHAVIOR MODELLING FOR AUTONOMOUS VEHICLE LANE CHANGE OPERATION

TECHNICAL FIELD

The present disclosure relates generally to autonomous vehicle operation, and in particular, some implementations may relate to improving lane change maneuvers for a more organic motion.

DESCRIPTION OF RELATED ART

Autonomous vehicles or highly automated vehicles can be configured to operate in a plurality of operational modes. An example of an operational mode is one in which a computing system is used to navigate and/or maneuver the vehicle along a travel route with minimal or no input from a human driver. Such vehicles are equipped with sensors that are configured to detect information about the surrounding environment, including the presence of objects in the environment. The detected information can be sent to the computing system. Other operational modes can include different levels of human input, including a manual mode in which a human driver navigates and/or maneuvers the vehicle through the surrounding environment. Such autonomous vehicles can be configured to switch between the various operational modes.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments. The embodiments illustrated in the figures should not be interpreted as limiting the scope of the technology disclosed herein.

FIG. 6A shows an example driver-performed lane change data plot in accordance with embodiments of the technology disclosed herein.

FIG. 6B shows an example first stage data plot of generation of an entity-specific lane change model in accordance with embodiments of the technology disclosed herein.

FIG. 6C shows an example second stage data plot of generation of an entity-specific lane change model in accordance with embodiments of the technology disclosed herein.

The figures are not exhaustive and do not limit the present disclosure to the precise form disclosed.

DETAILED DESCRIPTION

Currently, autonomous driving systems perform lane changes in a mechanical manner. Most current autonomous or semi-autonomous driving systems pre-program how a lane change is to be conducted. This generally results in a very inorganic movement (i.e., not very human-like). Given the number of variables involved in the decision (e.g., traffic level, speed of vehicle closing in the target lane, etc.), making a lane change in autonomous or semi-autonomous mode can present great risk to the safety of those in the changing vehicle and others in proximity. As such, the program is designed from a worst case scenario, such that the same lane change decision model is applicable in light, medium, or heavy traffic.

Embodiments of the systems and methods disclosed herein are provided to create lane change models for autonomous or semi-autonomous driving systems to make the maneuver feel more organic. As discussed in greater detail below, embodiments in accordance with the present disclosure collects a large amount of sensor and contextual data from a multitude of vehicle and driver types to generate a reasonably accurate model of how an average driver would perform a lane change operation in a given scenario. The data can be collected through a supervision or monitoring mode of the vehicles, collecting and associating a plurality of data types with each driver-performed lane change operation. This data may include both external and internal sensor data, providing context for the lane change operation. Large scale machine learning takes this wealth of information as an input to generate one or more models for determining, for the average driver, 1) if and when a lane change should occur and 2) how the lane change maneuver should be performed. Data types are identified for each driver-performed maneuver and compared against a safety metric to determine whether the driver-performed lane change operation was unsafe. If unsafe, that maneuver would be excluded from the training set. In this way, without any prior knowledge of the driver or the vehicle, the generated lane change model can provide an average behavior closer replicating the organic movement of a human driver.

Figure 1:
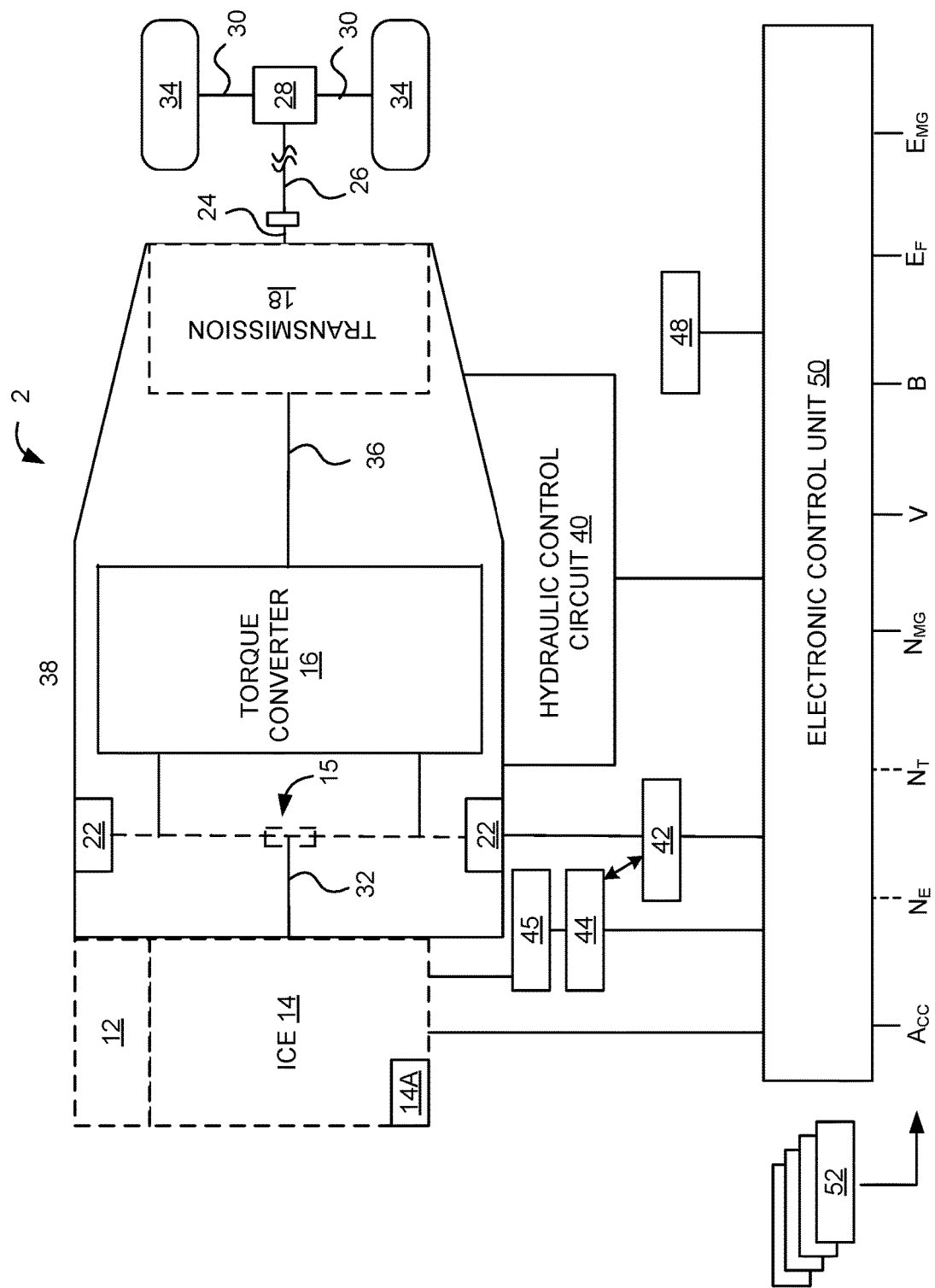
FIG. 1 is a schematic representation of an example hybrid vehicle with which embodiments of the technology disclosed herein may be implemented.

In various embodiments, the fleet vehicles may include a one or more of a variety of different vehicle types. The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods discussed herein can be implemented in other types of vehicle including gasoline- or diesel-powered vehicles, fuel-cell vehicles, electric vehicles, or other vehicles. A person of ordinary skill in the art would understand the technology disclosed herein is not limited in applicability to any particular type of vehicle platform or operation, and nothing in the present disclosure should be interpreted as limiting the scope of the technology as such.

As used herein, "autonomous driving system" means a driving system implemented in a vehicle and configured to operate in an autonomous mode. "Autonomous mode" means that one or more computing systems are used to navigate and/or maneuver the vehicle along a travel route with minimal or no input from a human driver. In one or more embodiments, the vehicle 102 may be highly automated.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MS}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). Non-limiting examples of the various internal or external conditions may include, but is not limited to, road conditions, weather, vehicles in proximity to vehicle 102, number of occupants, speed of vehicles in proximity to vehicle 102, location of vehicle 102 on the road, among other conditions. In some embodiments, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc. In various embodiments, vehicle 102 can include a plurality of sensors 52 that can be used to detect various driver actions, including but not limited to driver-monitoring cameras, steering wheel inputs, directional signaling controls, and other sensors 52 configured to detect driver actions.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Sensors 52 can further include hardware and software configured to enable vehicle to vehicle (V2V), vehicle to everything (V2X), vehicle to everything (V2E), or a combination of information exchange between the vehicle and external entities. As a non-limiting example, where both vehicles are capable of such communication, the trailing vehicle in the target lane may transmit its current speed and acceleration data to vehicle 102, which can then use that information in making the lane change decision. In various embodiments, other types of information may be transmitted to vehicle 102 from other vehicles and/or connected devices (e.g., traffic lights, road markers, etc.).

Vehicle 102 can have one or more operational modes, one or more of which can be configured to record data associated with driver performance. As a non-limiting example, vehicle 102 may have a manual operational mode wherein all navigation and/or maneuvering is performed by a human driver, regardless of warning or intervention systems (e.g., Level 0 (L0) as defined by the National Highway Traffic Safety Administration (NHTS)). As another example, vehicle 102 may have a conditional automation mode where a portion of the navigation and/or maneuvering of the vehicle along a travel route is performed by one or more computing systems of vehicle 102, and another portion is performed by a human driver (e.g., Levels 2 (L2) and/or Level 1 (L1) as defined by NHTS. As another example, in a monitored autonomous mode, where one or more computing systems are used to navigate and/or maneuver the vehicle with at least some human driver supervision required (e.g., Level 3 (L3) as defined by NHTS). Another example is a high automation mode, wherein one or more computing systems are used to navigate and/or maneuver a vehicle regardless of whether a human driver responds appropriately to a request to intervene (e.g., Level 4 (L4) as defined by NHTS). In these modes, driver-performed lane change operations may be monitored and the associated sensor data collected for use in modelling autonomous lane change operations when vehicle 102 operates in a full automation mode, wherein all operations are performed by without any expectation of driver input (e.g., Level 5 (L5) as defined by NHTS). These levels are provided for illustrative purposes only. If the definitions of the levels change, or new levels are added, a person of ordinary skill in the art would understand which mode such changes and/or new levels would fall based on the definitions.

Vehicle 102 can be configured to switch between the various operational modes. Such switching can be implemented in any suitable manner, now known or later developed. The switching can be performed automatically, or it can be done response to receiving a manual input or request.

FIG. 1 is provided for illustration purposes only as examples of vehicle systems with which embodiments of the disclosed technology may be implemented. One of ordinary skill in the art reading this description will understand how the disclosed embodiments can be implemented with various vehicle platforms.

Figure 2:
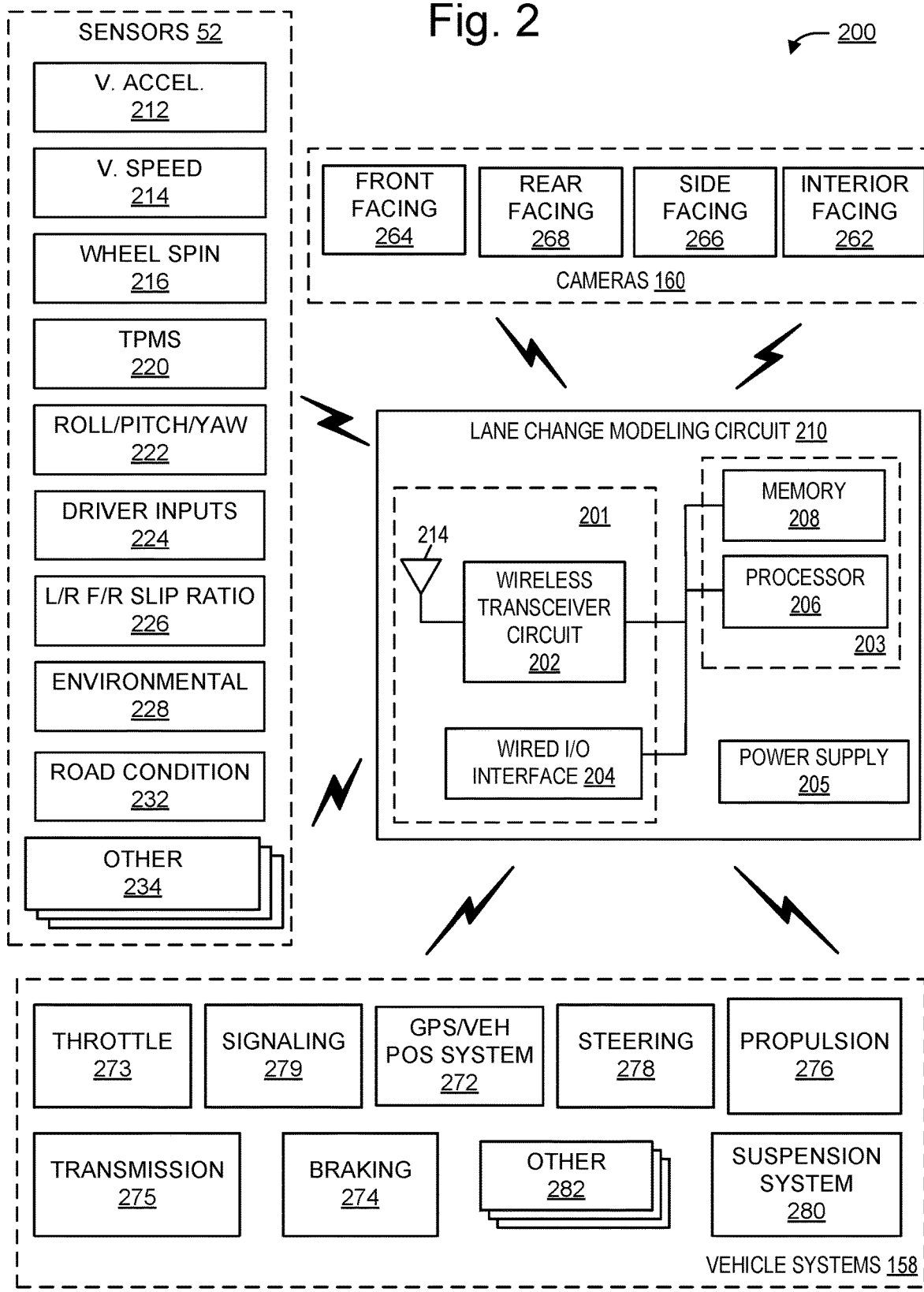
FIG. 2 illustrates an example architecture for sensor data collection and transmission in accordance with embodiments of the technology disclosed herein.

FIG. 2 illustrates an example architecture for sensor data collection and transmission in accordance with embodiments of the present disclosure. As shown, architecture includes a autonomous driving system 200 (comprising a lane change modelling circuit 210, a plurality of sensors 52, a plurality of cameras 160, and a plurality of vehicle systems 158. Sensors 52, cameras 160, and vehicle systems 158 can communicate with lane change modelling circuit 210 via a wired or wireless communication interface. Although sensors 52, cameras 160, and vehicle systems 158 are depicted as communicating with lane change modelling circuit 210, they can also communicate with each other as well as with other vehicle systems. Lane change modelling circuit 210 can be implemented as an ECU or as part of an ECU such as, for example electronic control unit 50. In other embodiments, lane change modelling circuit 210 can be implemented independently of the ECU.

Lane change modelling circuit 210 in this example includes a communication circuit 201, a decision circuit (including a processor 206 and memory 208 in this example) and a power supply 205. Components of lane change modelling circuit 210 are illustrated as communicating with each other via a data bus, although other communication in interfaces can be included.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to operate lane change modelling circuit 210.

Memory 208 can store non-transitory machine-readable instructions executable by processor 206 to receive data from sensors 52, cameras 160, and/or vehicle systems 158 to determine whether a lane change should occur and, if so, how such maneuver should be performed. A lane change model deployed in lane change modelling circuit 210 can use the data to make a decision on making a lane change, the model having been developed in accordance with embodiments of the present disclosure (discussed in detail below). Based on the contextual information (external and/or internal), processor 206 (executing the model) can predict if a lane change should be made (e.g., slower traffic in current lane), and how the maneuver can be completed in a safe manner and in a more organic way (determined by the model after training as discussed below).

In some embodiments, determining whether a lane change should occur and/or how to perform a lane change can be determined by scoring the similarity of the current scenario (based on the collected contextualize data) to a baseline model of the lane change model. As a non-limiting example, scoring whether to perform a lane change may be affected based on the distance between the vehicle's current position and a destination. If the distance falls below a particular passing threshold, a lane change may not be warranted regardless of slower traffic in the current lane. Moreover, a turning threshold may be used to determine whether the vehicle is within a certain distance of an intended exit or turn and needs to change lanes to be in position to execute the maneuver. For determining how to conduct a lane change, the scoring could be affected by the speed of vehicles in the lane to which the vehicle intends to move. If the trailing vehicle's speed exceeds a closing speed threshold, processor 206 can lower the score of maneuvers in which no acceleration of the vehicle is included when making the lane change.

Scores may be provided for a number of different parameters relevant to determine a safe lane change, including but not limited to closing speed of trailing vehicles, amount of space available in intended lane, speed of a vehicle in front in the same lane, conditions of the road, environmental conditions, position of vehicle relative to destination, layout of upcoming roadway, among others. This is not intended as an exhaustive list, but is provided to illustrate the granularity with which scoring may be performed. The lane change model can be trained to identify relationships between the various parameters, enabling lane change modelling circuit 210 to make determinations in real-time and specific to the given parameters of the scenario.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a lane change modelling circuit 210.

Communication circuit 201 either or both a wireless transceiver circuit 202 with an associated antenna 214 and a wired I/O interface 204 with an associated hardwired data port (not illustrated). As this example illustrates, communications with lane change modelling circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Wireless transceiver circuit 202 can also include a transmitter and a receiver (not shown) to allow cellular communications via any of a number of cellular communication standards, such as, for example, 3G, 4G, LTE, EDGE, 5G, or other cellular standards. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by lane change modelling circuit 210 to/from other entities such as sensors 52, cameras 160, and vehicle systems 158.

Wired I/O interface 204 can include a transmitter and a receiver (not shown) for hardwired communications with other devices. For example, wired I/O interface 204 can provide a hardwired interface to other components, including sensors 52, cameras 160, and vehicle systems 158. Wired I/O interface 204 can communicate with other devices using Ethernet or any of a number of other wired communication protocols whether standardized, proprietary, open, point-to-point, networked or otherwise.

Power supply 205 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Lane change modelling circuit 210 can communicate with sensors 52. The description with the present disclosure for common references should be interpreted as applying to all figures in which such common reference is present unless explicitly stated otherwise. "Sensor" means any device, component, and/or system that can detect, determine, assess, monitor, measure, quantify, and/or sense something. The one or more sensors can be configured to detect, determine, assess, monitor, measure, quantify, and/or sense in real-time. As used herein, "real-time" means a level of processing responsiveness that a user or system senses as sufficiently immediate for a particular process or determination to be made, or the enables the processor to keep up with some external process. In various embodiments, sensors within sensors 52 can work independently from each other, while in other embodiments one or more sensors within sensors 52 can work in combination with each other.

Sensors 52 can include additional sensors that may or may not otherwise be included on a standard vehicle 10 with autonomous driving system 200 is implemented. In the illustrated example, sensors 52 include vehicle acceleration sensors 212 (e.g., speedometer), vehicle speed sensors 214, wheel-spin sensors 216 (e.g., one for each wheel), a tire pressure monitoring system (TPMS) 220, accelerometers such as a 3-axis accelerometer 222 to detect roll, pitch and yaw of the vehicle (e.g., a gyroscope, accelerator, inertial measurement unit, or any other sensor for sensing position and orientation of vehicle 102), driver input sensors 224 (e.g., steering wheel inputs), left-right and front-rear slip ratio sensors 226, environmental sensors 228 (e.g., to detect salinity or other environmental conditions), and road condition sensors 232 (e.g., surface conditions, traffic level, etc.). Environmental sensors 122 can be configured to acquire, detect, determine, assess, monitor, measure, quantify, and/or sense driving environment data, including but not limited to data or information about the external environment in which vehicle 102 is located, objects within said environment (stationary and/or dynamic), lane markers, signs, traffic lights, traffic signs, lane lines, crosswalks, curbs proximate to vehicle 102, among others. Additional sensors 234 can also be included as may be appropriate for a given implementation of lane change modelling circuit 210, including but not limited to seat position sensors, haptic actuators, and sensors 52 discussed with respect to FIG. 1 (e.g., sonar, radar, lidar or other vehicle proximity sensors). As another non-limiting example, identification sensors can be included in sensors 52. Identification sensors can include identification readers (e.g., NFC, RF, ZigBee) configured to detect an identification signal emitted from an identification tag (e.g., in the key fob or a separate tag held by the individual). In other embodiments, the identification sensors may include biometric identification systems, including but not limited to ocular sensors, fingerprint readers, facial recognition systems, voice recognition, or other biometric indicator.

Cameras 160 can include any number of different vehicle image sensor components or subsystems used to capture images of scenes both internal and external to the vehicle. "Camera" includes any device(s), component(s), and/or system(s) configured to capture visual data, including video and/or image data in any suitable form. In this example, cameras 160 include interior facing cameras 262 oriented to capture visual data from the interior of the vehicles (e.g., driver monitoring, eye tracking, etc.), front facing cameras 264 oriented to capture visual data of the scene of the area in front of the vehicle, side facing cameras 266 oriented to capture visual data of the scene on either side of the vehicle (e.g., side mirror cameras), and rear facing cameras 268 oriented to capture visual data of the scene behind the rear of the vehicle (e.g., backup cameras). Cameras 160 can be any type of image sensor system known in the art, including high-definition cameras, high dynamic range cameras, infrared (IR) cameras, a lens and detector array system (e.g., charge coupled device (CCD) sensor, complementary metal oxide semiconductor (CMOS) sensor, etc.). In various embodiments, one or more of cameras 160 can be configured to not change position relative to vehicle 102, while in other embodiments one or more cameras 160 can be configured to change position, relative to vehicle 102, a driver or occupant, motion within an interior or exterior of the vehicle, or a combination thereof.

Vehicle systems 158 can include any of a number of different vehicle components or subsystems used to control or monitor various aspects of the vehicle and its performance. In this example, vehicle systems 158 includes a propulsion system 276, a braking system 274, a steering system 278, a throttle system 273, a transmission system 275, a signaling system 279, suspension system 280 such as, for example, an adjustable-height air suspension system, and other vehicle systems, and a GPS or other vehicle positioning system 272. Data collected by vehicle systems 158 may be used in providing additional context for a particular driver-performed lane change operation to facilitate more granular differentiation between scenarios for determine if and how to perform an autonomous lane change maneuver. For example, data from suspension system 280 may be used in determining whether a particular maneuver would be safe based on the particular road conditions. Other vehicle systems 282 can be included in various embodiments, such as but not limited to safety systems, the electrical system, occupant identification systems, among others.

As discussed above, embodiments in accordance with the present disclosure utilizes a large quantity of driver-performed lane change maneuver data to generate a model of the "average" driver. With respect to the present disclosure, an "average driver model" comprises a training set of a plurality of safe lane change maneuvers performed in a variety of different scenarios, which can be compared with real-time data to determine the probability of performing a lane change in the safest manner (including deciding not to make a lane change). In this way, a more organic lane change model may be programmed into an autonomous or semi-autonomous driving system at the start, enabling the vehicle to make lane changes in a manner more similar to that of a human driver.

Figure 3:
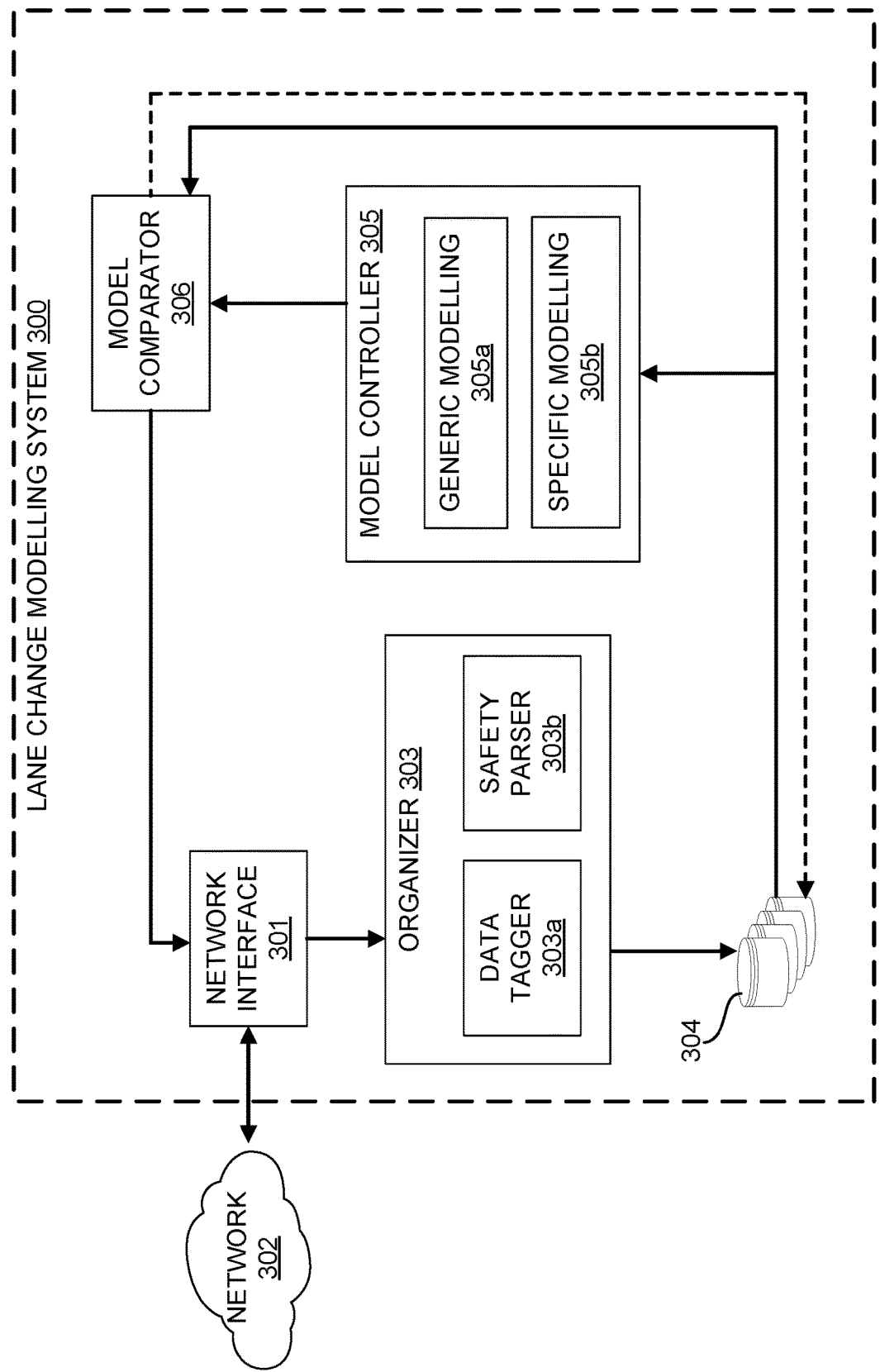
FIG. 3 illustrates an example lane change modelling system in accordance with embodiments of the technology disclosed herein.

FIG. 3 illustrates an example lane change modelling system 300 in accordance with embodiments of the present disclosure. Lane change modelling system 300 is provided for illustrative purposes only, and should not be interpreted as limiting the scope of the technology to only the illustrated embodiment. Although discussed as a single system, a person of ordinary skill in the art would understand that the components of lane change modelling system 300 may be contained within the same device and/or data center in some embodiments, while in others the different components may be dispersed across a distributed network. Portions of lane change modelling system 300 may be contained on the vehicles themselves (e.g., within the ECU) or in a cloud computing system. Lane change modelling system 300 may be a stand alone neural networking system configured to conduct the modelling and prediction functions discussed herein, while in other embodiments lane change modelling system 300 may be incorporated into a single autonomous driving modelling system. A person of ordinary skill in the art would understand that the technology disclosed herein is applicable in any type of predictive modelling and machine learning implementation where related lane change data is available.

As shown in FIG. 3, lane change modelling system 300 includes a network interface 301 communicatively coupled to a network 302. As discussed above, lane change modelling system 300 uses as an input data for driver-performed lane change operations collected from a variety of sensors and other information sources. In various embodiments, network 302 may comprise one or more different networks, each comprising a different network communication protocol. Network interface 301 can include either or both of a wireless transceiver circuit with an associated antenna and a wired I/O interface, similar to the communication circuit 201 discussed with respect to FIG. 2. Network interface 301 of FIG. 3 is configured to enable lane change modelling system 300 receive input data from the fleet vehicles and other connected sources (e.g., Internet, infrastructure equipment, etc.) for use in modelling operations.

Lane change modelling system 300 is configured to take the large amount of data available from a fleet of vehicles to model the average driver's lane change behavior. Data received through network interface 301 is normalized and sorted by organizer 303 in various embodiments. In various embodiments, organizer 303 can comprise a dedicated processing resource of a computing device, a data center, a distributed computing network, and/or a cloud computing system. In various embodiments, organizer 303 may comprise a neural network within lane change modelling system 300, such as but not limited to a recurrent neural network, a modular neural network, or other type of neural network.

Organizer 303 can comprise a data tagger 303a and a safety parser 303c. Data tagger 303a can be configured to mark or tag received driver-performed lane change operation data such that the data is associated together and identifiable. In various embodiments, data tagger 303a may comprise one or more circuits comprising hardware, software, and/or firmware configured to mark received data streams as being received from a particular driver, from a particular vehicle, from a particular type of vehicle, among other identifiable criteria. In various embodiments, data tagger 303a can add an identifier to the metadata of the collected data. As a non-limiting example, data tagger 303a can add to each data received a metadata tag indicating the data stream over which the data was received, a time stamp indicating when the data was received, the name of the connected vehicle from which the data was collected, among others.

Organizer 303 can further include a safety parser 303b. As discussed above with respect to FIGS. 1 and 2, embodiments of the present disclosure can compare the received data regarding a driver-performed lane change operation to determine whether the maneuver was safe or unsafe, and discard unsafe maneuvers from being included in the training data set. Safety parser 303b can comprise circuits comprising hardware, software, and/or firmware configured to compare received data against respective safety thresholds. As a non-limiting example, safety parser 303b can maintain a closing speed threshold representing a maximum speed of a closing vehicle considered safe by the system, based on governmental or organizational safety policy requirements and regulations. This is provided only as an example; a person of ordinary skill in the art would understand how to generate safety thresholds related to each of the different types of data received from the vehicles. Non-limiting examples include safety thresholds for closing distance, space available in target lane, speed of vehicles in front of the vehicle, weather conditions, road conditions, acceleration ability of the vehicle platform type, amount of steering wheel input during lane change operation, among others.

When safety parser 303b determines that one or more safety thresholds are not met, that specific driver-performed lane change operation can be discarded and not included in the generic model training data set. In other words, safety parser 303b identifies all of the received data marked or tagged by data tagger 303a as being related to the same driver-performed lane change operation and discard all of that data. In various embodiments, if any safety threshold is not met, safety parser 303b can discard that specific driver-performed lane change operation's data, while in others safety parser 303b may weight certain safety thresholds more than others, providing a tolerance level for driver-performed lane change operations. As a non-limiting example, in such embodiments a safety threshold concerning turn signal use can be given a lower weight than other thresholds. Where only the turn signal safety threshold is not met but the maneuver was otherwise deemed "safe," safety parser 303b can add the maneuver to the training data set repository 304. In various embodiments, training data set repository 304 can include a memory controller or other circuitry and/or software to normalize the data from safety parser 303b for use in modelling.

Model controller 305 can provide two options for training machine learning models. As discussed above, lane change modelling system 300 can determine an "average" driver behavior model based on the plurality of diverse driver-performed lane change operations collected from network 302. As illustrated in FIG. 3, model controller 305 includes a generic modeling 305a operation and a specific modeling 305b operation.

Generic modeling 305a can be configured to generate the generic model of an average driver, generated based on the accumulated driver-performed lane change operations from the fleet of vehicles. A training data set from training data set repository 304 is retrieved and used to generate an average driver model. FIG. 6A shows an example driver-performed lane change data plot in accordance with embodiments of the present disclosure. The example driver-performed lane change data plot can be used in generating a generic driver profile, like the generic model generated by generic modeling 305a discussed with respect to FIG. 3. Each data point ("o") 601 is indicative of a driver-performed lane change maneuver, representing a plurality of factors defining the lane change maneuver. The model controller 305 of FIG. 3 can consider a plurality of different criteria for determining if the maneuver falls within the safety boundary 605 shown in FIG. 6A. Non-limiting examples of criteria which may be included in determining where a driver-performed lane change maneuver is safe can include: speed of the vehicle; activity within the vehicle (e.g., data from interior cameras); traffic level; weather conditions; external hazards; angle of attack for the maneuver (i.e., amount of jerk in the steering wheel; vehicle platform type (e.g., sedan, pick-up, SUV); speed to perform the maneuver; closing speed of trailing vehicles; among others. This listing is provided only for illustrative purposes, and each data point could be determined using a plurality of additional data.

As shown in FIG. 6A, the data points 601 are dispersed within and around the safety boundary 605. Many data points 601 fall within the safety boundary 605, indicating the maneuver was deemed safe, such as safe data point 601a. In various embodiments, the collection of safe data points 601*a* can be used by the model controller 305 in creating the generic model for autonomous lane change maneuvers (i.e., constitutes the training data set). Maneuvers deemed unsafe fall outside of the safety boundary 605, such as unsafe data point 601*b*. In various embodiments, the unsafe data points 601*b* can be excluded from the training data set, ensuring that only safe data points 601*a* are present in the training data set. In some situations, a driver-performed lane change maneuver may fall along the boundary line of safety boundary 605, such as boundary data point 601*c*. In various embodiments, boundary data points 601*c* can be always ignored, while in other embodiments boundary points can be included which fall within a threshold distance from the boundary of the safety boundary 605. In various embodiments, the threshold can be set at a percentage difference between boundary data point 601*c* and the boundary of the safety boundary 605. As a non-limiting example, the threshold could be set such that a boundary data point 601*c* which is within safety boundary 605 and offset from the boundary by less than 25% is disregarded, as the boundary data point 601*c* is closer to being unsafe than safe. The threshold value is provided for illustrative purposes only, and a person of ordinary skill in the art would understand that setting the threshold value depends on the requirements of the implementation. The examples provided would not be interpreted as limiting the scope of the technology only to the illustrative example. Using this training data set, model controller 305 can generate an average (generic) driver lane change maneuver profile suitable for all vehicle platforms.

As discussed above, specialized driver models can be created, both for different individuals and for different vehicle platforms. FIGS. 6B and 6C show the generation of an entity-specific lane change model in accordance with embodiments of the present disclosure. FIGS. 6B and 6C can be illustrative of the specific model generation performed by specific modelling 305*b* of model controller 305 of FIG. 3. The "entity" of an entity-specific lane change model can refer to an individual, a vehicle platform type, or a vehicle model type, among others. A person of ordinary skill in the art would understand that the specification can be even more granular, if desired, based on the requirements of the implementation, and the listed entities above are provided for illustrative purposes only and should not limit the scope of the technology disclosed herein.

To generate an entity-specific model the system needs to collect data associated with the particular entity. In various embodiments, the collected data can be associated with an individual, a vehicle platform type, or a model type, among others. In various embodiments, the data collected can be tagged or otherwise identified with an individual, platform type, or other identifying factor suitable for generating a entity-specific lane change maneuver profile. As shown in FIG. 6B, entity-specific data points 602 can be collected. The entity-specific data points ("+") 602 can be generated in the same manner as the data points 601 discussed with respect to FIG. 6A, only being based on collected information associated with that entity. As a non-limiting example, if an entity-specific model is being generated for Driver A, each entity-specific data point 602 would be generated only using driver-performed lane change data associated with Driver A. In this way, an entity-specific training data set can be developed.

Because a large amount of data is required to generate an accurate model of an entity's lane change performance, specific modelling 305*b* by model controller 305 does not occur immediately. A density of entity-specific data points 602 is required for there to be sufficient data indicative of a disconnect between the generic model and how this entity performs. In FIG. 6B, such a density is missing, with only a sporadic entity-specific data points 602 present. Like the data points 601, entity-specific data points 602 can fall outside the safety boundary and be discarded, like unsafe data point 601*b*, within safety boundary 605 and included in the training data set, like safe data point 601*a*, or on the boundary and treated as either safe or unsafe, like with boundary data point 601*c*. In various embodiments, an entity-specific model may not be generated where there is an insufficient amount of entity-specific data points or where there is not a high density of entity-specific data points 602*a* indicative of a variation from the generic model.

Where a density of entity-specific data points 602*a* are determined, the entity-specific lane change model can be generated. FIG. 6C shows a high density grouping of entity-specific data points indicating the variation, in accordance with the technology disclosed herein. As shown, a high density region 610 of entity-specific data points 602*a* is present within safety boundary 605. In various embodiments, this is an indication that the entity prefers to perform lane change maneuvers in a manner different from the generic model. Now that a density region 610 is present, model controller 305 of FIG. 3 can begin to generate an entity-specific lane change maneuver model using the entity-specific data points 602*a*. In various embodiments, generating the entity-specific lane change maneuver model can be done by modifying the generic model adding the entity-specific data points 602*a* within the density region 610 to the generic training data. The additional entity-specific data will result in changes to the generic model in those regions, making the model operate in a manner closer to that of the driver if manually controlling the car in similar situations and generating an entity-specific lane change maneuver model. The entity-specific model is similar to the generic model, but the density region 610 data creates a modified region that is specifically tailored to how the entity prefers to perform the maneuver in similar situations. A threshold density may be required before such modification is performed. In various embodiments, the threshold density may be determined based on the particular requirements of the implementation.

In other embodiments, the entity-specific lane change maneuver model can be created by using only the entity-specific data points 602*a*. Such a model can only be generated when a data set threshold has been met. The data set threshold is a set number of entity-specific data points 602*a* falling within the safety boundary 605. When exceeded, the system has sufficient data to confidently model using only the entity-specific data. In this way, the entity-specific model can be created that is tailored to the particular entity.

The generated entity-specific model can be associated with the entity and, when necessary, the entity-specific model can be used instead of the generic model. As a non-limiting example, where the entity is an individual driver, an entity-specific lane change maneuver model is associated with that driver and, when that driver is detected to be piloting a vehicle, the system can upload the associated entity-specific lane change maneuver model to the vehicle. In this way, when the vehicle is operating in an autonomous or semi-autonomous mode, the vehicle will still perform lane changes in a manner similar to the driver. As another non-limiting example, where the entity is a vehicle platform type, an entity-specific lane change maneuver model can be created for that particular vehicle platform type (e.g., a sedan), and this entity-specific model can be used by all sedans when placed into autonomous or semi-autonomous mode.

In various embodiments, class-specific lane change maneuver models can be created by applying different safety criteria, defining in a different safety boundary 605. Changing the safety boundary 605 will change the relative location of data points 601, 602, resulting in changes to the resulting model. As a non-limiting example, when children are present in the car some maneuvers previously considered safe when only adults were present may be considered less safe with children present. In such situations, the criteria defining the safety boundary 605 can be changed, resulting in some maneuvers previously deemed safe falling outside of the revised safety boundary 605. Model controller 305 can then generate a class-specific lane change maneuver model to use when children are present in the vehicle. The generic lane change model discussed above can be considered a type of class-specific lane change maneuver model, with the class being the average driver. In various embodiments, model controller 305 can combine more than one training data set to generate hybrid-specific lane change maneuver models. As a non-limiting example, model controller 305 can use both a driver-specific training data set and a children-specific training data set in the specific modelling 305b, resulting in a model to use when the driver is detected as operating the vehicle but there are also children present. Detecting the presence of individuals can be accomplished through a variety of different methods for identify occupants well-known in the art.

The various types of models discussed herein enable any vehicle to perform lane changes more organically and human-like from the first time it starts up. The generic model can be used to provide some level of organic motion as a baseline. Entity-specific models can provide more granularity, allowing the model to be tailored to the specific likes and needs of a driver, a vehicle platform type, etc. Class-specific models can be used to covering classes of variables, such as (but not limited to) children. Even greater granularity can be obtained through hybrid-specific lane change models, generated using training data sets from different entity-specific and class-specific models.

Figure 4:
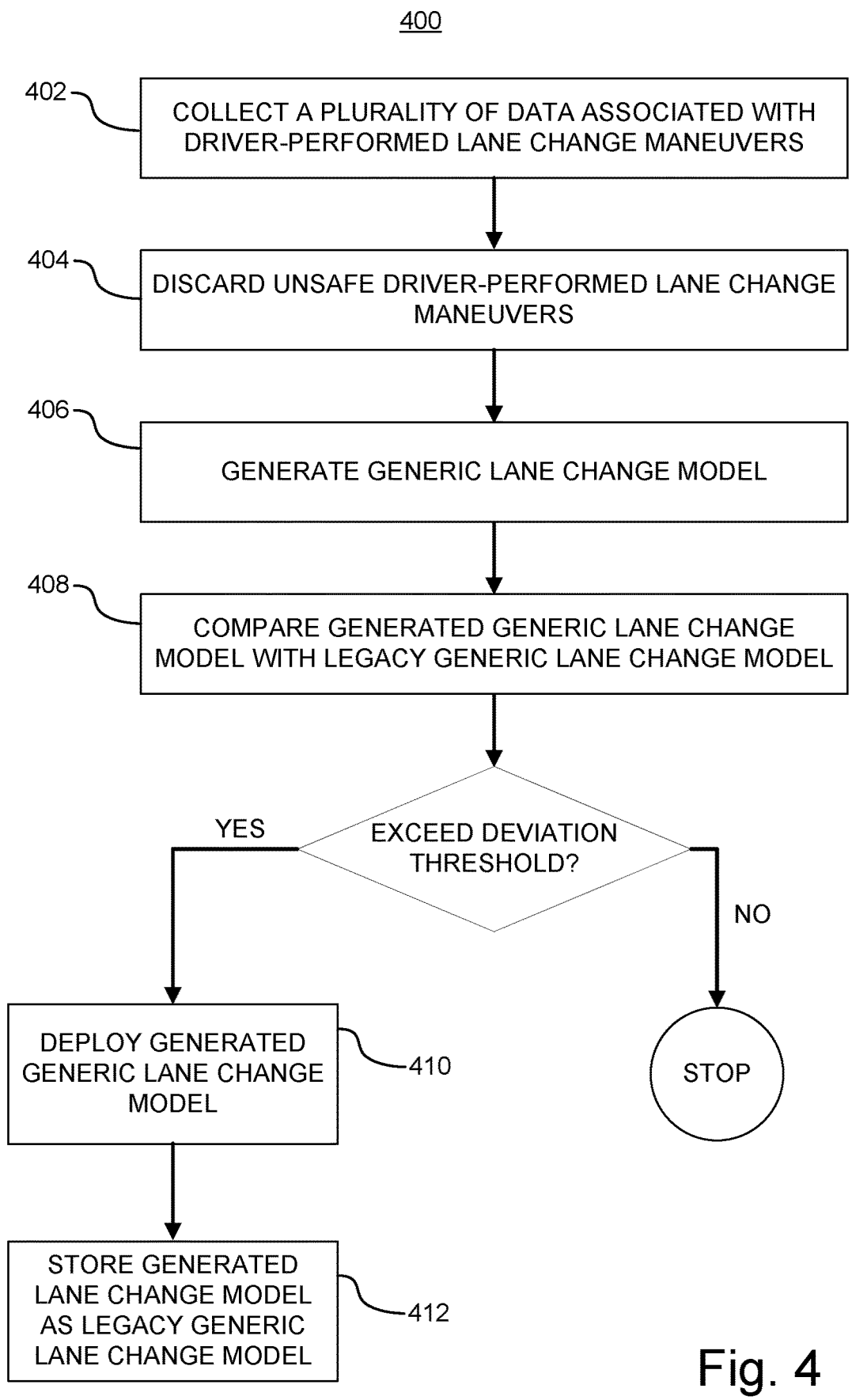
FIG. 4 illustrates an example generic model generation process in accordance with embodiments of the technology disclosed herein.

FIG. 4 shows an example generic model generation process 400 in accordance with embodiments of the present disclosure. At operation 402 a plurality of data associated with driver-performed lane change maneuvers is collected. Collecting the plurality of data can be performed as discussed above with respect to network interface 301 of FIG. 3, and the plurality of data can comprise the sensor data and other information discussed above with respect to FIGS. 1 and 2. Once collected, the plurality of data is parsed and unsafe driver-performed lane change maneuvers are discarded at operation 404. The discarding of operation 404 can be performed as discussed with respect to organizer 303 of FIG. 3. In various embodiments, operation 404 can comprise circuitry and/or software for associating the data received to a specific driver-performed lane change, such as data tagger 303a discussed with respect to FIG. 3.

Once the unsafe maneuvers are discarded, a model of a generic lane change model representing an "average" driver is generated at operation 406. In various embodiments, operation 406 can be performed through generic modeling 305a discussed above with respect to FIG. 3. In various embodiments, generic modeling 305a can comprise one or more pattern matching and comparison algorithms to develop a model trained to predict when and how an average driver would make a lane change, based on real-time input.

After generating the generic lane change model, in some embodiments generic model generation process 400 can proceed to operation 408, where the generated generic model is compared to a legacy generic model. This operation can be performed by model comparator 306 discussed with respect to FIG. 3. Model comparator 306 can compare outputs from model controller 305 against the currently-deployed model to determine if an update is required. In various embodiments, model comparator 306 may compare two models (i.e., the currently deployed model and the new model) to determine if there is a deviation in performance requiring an update, based on a deviation threshold. Model comparator 306 can compare both models in various scenarios and determine how many scenarios result in a different decision. If the total number of instances of disagreement exceeds a specific number (i.e., the deviation threshold), model comparator 306 can determine an update is required and send the new model to network interface 301 for deployment to the vehicle. In various embodiments, when model comparator 306 determines an update is required, model comparator 306 may output the new model to training data set 304. In various embodiments, model comparator 306 includes timestamp information with the new model communicated to training data set 304, enabling model controller 305 to determine if a refresh of training data is in order (i.e., to avoid stale data being used in training).

In various embodiments, the legacy generic lane change model is retrieved from a non-transitory machine-readable memory resource, such as training data set repository 304 discussed with respect to FIG. 3. In some embodiments, the legacy generic lane change model may be maintained in a partition of training data set repository 304 dedicated to storing models, while in other embodiments a separate memory resource, a model repository, can be used to store generated models.

When first creating the generic lane change model, there would be no legacy lane change model. In such instances, operation 408 would determine that the number of disagreements between the generated lane change model and the legacy lane change model would exceed a deviation threshold (e.g., the deviation threshold discussed with respect to FIG. 3) and would deploy the generated generic lane change model at 410 to one or more fleet vehicles. Where a previous generic lane change model has been created, the generated lane change model is compared against the legacy lane change model with respect to a plurality of scenarios. If the deviation threshold is exceed, the process 400 moves to operation 410. If the deviation threshold is not exceeded, the process 400 stops. The system does not make any changes.

If the generated generic lane change model is deployed for whatever reason, process 400 moves to operation 412 and stores the generated generic lane change model as the legacy generic lane change model. In various embodiments, storing can include sending the deployed model to the same model repository discussed above with respect to operation 406. Storing the deployed model keeps the lane change modelling system current with respect to the versions of the lane change model deployed in the fleet.

Figure 5:
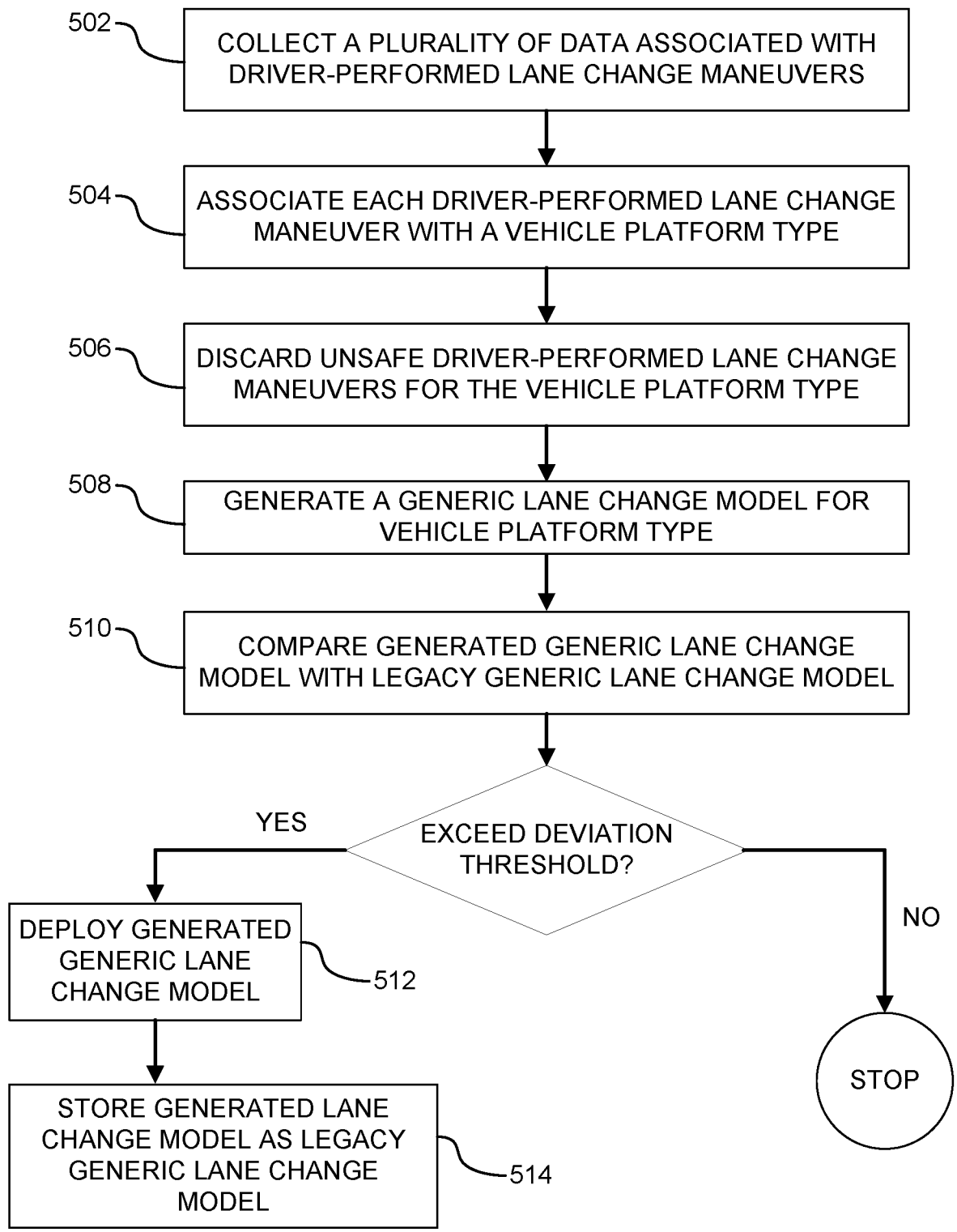
FIG. 5 illustrates an example specific model generation process in accordance with embodiments of the technology disclosed herein.

Referring back to FIG. 3, model controller 305 can also perform specific modelling 305b. Depending on the type and amount of data received from network 302, lane change modelling system 300 can generate a variety of generic lane change models for, as a non-limiting example, specific vehicle platforms. FIG. 5 shows an example specific model generation process 500 in accordance with embodiments of the present disclosure. For ease of discussion, specific model generation process 500 shall be discussed with respect to generation of a vehicle platform-specific generic lane change model. However, a person of ordinary skill in the art would understand that the example process 500 is applicable to produce lane change models with different levels of granularity. As a non-limiting example, process 500 can be used to generate lane change models for specific drivers, specific driving styles, specific environmental conditions, or specific models of a given vehicle platform type, among others. Moreover, a person of ordinary skill in the art would appreciate that process 500 could be used to produce lane change models having multiple levels of specification, such as but not limited to a lane change model for a specific driver when the driver is operating a specific vehicle platform type. Nothing in this disclosure should be interpreted as limiting the scope of the technology only to the illustrative example process 500.

At operation 502, a plurality of data associated with driver-performed lane change maneuvers is collected, in the same manner as the collection at operation 402. Each driver-performed lane change maneuver is associated with a particular vehicle platform type as operation 504. The probability of making a safe lane change in a given scenario can differ between vehicle platforms, such as a coupe or a truck. Each vehicle platform has its own physical characteristics which impact the ability to perform specific maneuvers. Accordingly, various embodiments in accordance with the present disclosure allow different generic lane change models to be generated for each vehicle platform. In this way, without knowing any information about the driver of the vehicle or the specific capabilities of the vehicle (e.g., trim, optional performance packages, after market modifications, etc.), the vehicle is provided with a suitable lane change model to utilize during operation to perform an organic and safe lane change operation in autonomous or semi-autonomous mode. In various embodiments, associating each maneuver with a vehicle platform type can include adding a tag to the metadata of the associated data received.

After associating each maneuver with a vehicle platform type, unsafe driver-performed lane change maneuvers are discarded for that vehicle platform type at operation 506. In various embodiments, the discard procedure can be performed in a manner similar to that discussed with respect to organizer 303 of FIG. 3 and operation 404 of FIG. 4. In various embodiments, the lane change modelling system performing process 500 can maintain a plurality of different safety threshold variations, one or more for each vehicle platform type. The plurality of safety thresholds can be stored in a memory resource, such as training data set repository 304 discussed above with respect to FIG. 3, while in other embodiments a separate memory resource can be included to maintain safety thresholds. In various embodiments, operation 506 can comprise identifying the respective vehicle platform type and retrieving the respect safety thresholds from a memory resource. After discarding unsafe maneuvers, process 500 moves to operation 508 and generates a generic lane change model for the vehicle platform type. Operation 508 can be similar to operation 406 discussed with respect to FIG. 4, only with the generic lane change model being generated based on a training data set associated with a particular vehicle platform.

In various embodiments, the vehicle platform-specific training data sets can be maintained in a dedicated portion of training data set repository 304 discussed with respect to FIG. 3, in the same portion but with an identifier attached, in a separate memory resource configured as a vehicle platform-specific version of training data set repository 304, or a combination thereof. In some embodiments, operation 506 can comprise storing the non-discarded data in a dedicated portion of training data set repository 304 discussed with respect to FIG. 3, in the same portion but with an identifier attached, in a separate memory resource configured as a vehicle platform-specific version of training data set repository 304, or a combination thereof. Operation 508 can further comprise retrieving the respective training data set for the vehicle platform type from the respective memory resource for use in generating the generic lane change model for the vehicle platform type.

After generating the generic lane change model for a given vehicle platform type, this generated model can be compared against a legacy generic lane change model for the respective vehicle platform type at operation 510. In various embodiments, operation 510 can be performed in a manner similar to operation 408 discussed with respect to FIG. 4. In some embodiments, the vehicle platform-specific lane change model may be the first lane change model generated, meaning that the legacy generic lane change model may be non-existent, similar to the instance where a generic lane change model is first generated discussed above with respect to operation 408 of FIG. 4. In such instances, operation 510 of FIG. 5 would determine that the number of disagreements between the generated lane change model for the vehicle platform type and the legacy model would exceed a deviation threshold and decide to deploy the new generated model to the respective vehicles. Where a previous generic lane change model has been created, the legacy generic lane change model can be either the generic lane change model generated at operation 406 of FIG. 4 or the vehicle platform-specific model generated at operation 508 of FIG. 5.

In either event, if the deviation threshold is exceeded for any reason, process 500 moves to deployment of the generated generic lane change model at operation 512 and storing the generated model as the legacy lane change model for that vehicle platform type at operation 514. Operations 512 and 514 can be performed in a manner similar to operations 410 and 412 discussed with respect to FIG. 4, except that the deployment is only to vehicles within the fleet that match the respective vehicle platform type rather than to the entire fleet. In some embodiments, prior to deployment a driver of a vehicle of the type may be prompted to determine if they would like to change the currently deployed model. If the deviation threshold is not exceeded, the process 500 stops. The system does not make any changes.

The level of granularity for specific modelling 305b depends on the particular implementation and the type of data that can be collected by the lane change modelling system. In various embodiments, the generic lane change model of FIG. 4 can be modified to produce a specific lane change model for a particular driver where lane change modelling system 300 collects data identifying the driver of the driver-performed lane change maneuvers. As a non-limiting example, the driver-performed lane change maneuvers may have associated driver monitoring data from one or more sensors (e.g., cameras) that can identify the driver of the vehicle. At operation 504, the data collected may be associated with that particular driver and, through process 500, a driver-specific lane change model can be created. In various embodiments, a driver-specific lane change model can be created not only based on the generic lane change model, but also for each of the vehicle platform-specific lane change models, resulting in another layer of granularity.

Figure 7B:
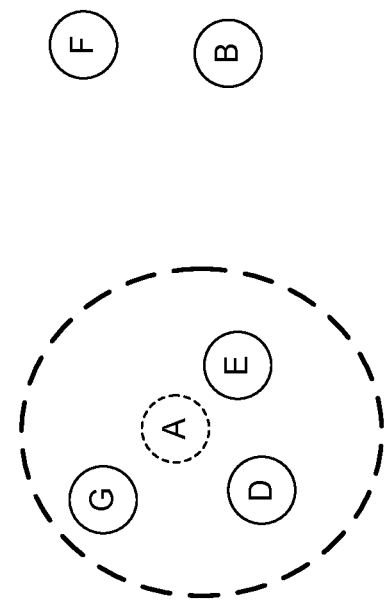
FIG. 7B shows an example identification of driver-specific lane change maneuver models for a plurality of drivers associated with a second vehicle model and a predicted driver-specific model in accordance with embodiments of the technology disclosed herein.
Figure 7A:
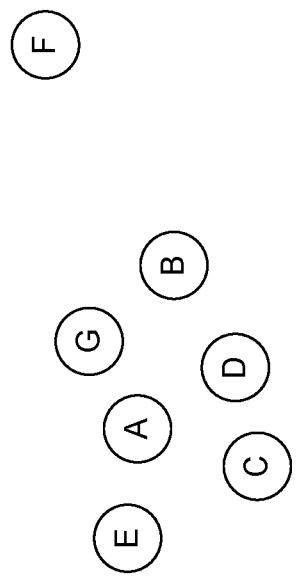
FIG. 7A shows an example identification of driver-specific lane change maneuver models for a plurality of drivers associated with a first vehicle model in accordance with embodiments of the technology disclosed herein.

Driver-specific models are often statistically tied to the type of vehicle driven. In various embodiments, when a driver changes vehicle types (platform or model), the driver-specific lane change model can be updated based on similar changes in driver-specific models of other individuals. FIGS. 7A and 7B show generation of vehicle-based driver-specific models in accordance with embodiments of the present disclosure. Although discussed with respect to specific vehicle model types, a person of ordinary skill in the art would understand that this ability to generate a predicted model for a driver with respect to any variable, such as but not limited to vehicle platform type. FIG. 7A shows that a driver-specific lane change maneuver model has been associated for each Driver A-G with respect to vehicle 1. The majority of the drivers (Drivers A-E and G) are generally grouped together, with Driver F being an outlier. When Driver A buys new vehicle (vehicle model 2), there is initially no driver-specific model associated with vehicle model 2 because Driver A has not previously driven vehicle model 2. However, a predicted vehicle-based driver-specific model can be generated based on similar models of other drivers associated with vehicle model 2. As shown in FIG. 7B, Drivers B, D, E, F, and G have driver-specific lane change maneuver models associated with vehicle model 2. Accordingly, the system can leverage the fact that Driver A was grouped close to Drivers B, C, D, E, and G with respect to vehicle model 1 to predict how Driver A may prefer to perform lane changes in vehicle model 2. In this way, a driver-specific model can be used for Driver A when Driver A drives vehicle model 2 for the first time, rather than relying on the generic model at the start. As seen in FIG. 7B, the predicted model for Driver A (illustrated as a broken circle) can be generated by using the models for Drivers D, E, and G associated with vehicle model 2. These models are chosen because: (1) their vehicle model 1 models are similar to the vehicle model 1 models for driver A and (2) their vehicle model 2 models are the most likely type of model transformation. Driver B is not included, despite being close to Driver A with respect to vehicle model 1 because Driver B's model for vehicle model 2 is far off from the group, thereby being considered an outlier like Driver F. As can be seen, Driver C is also not associated with vehicle model 2.

Figure 8:
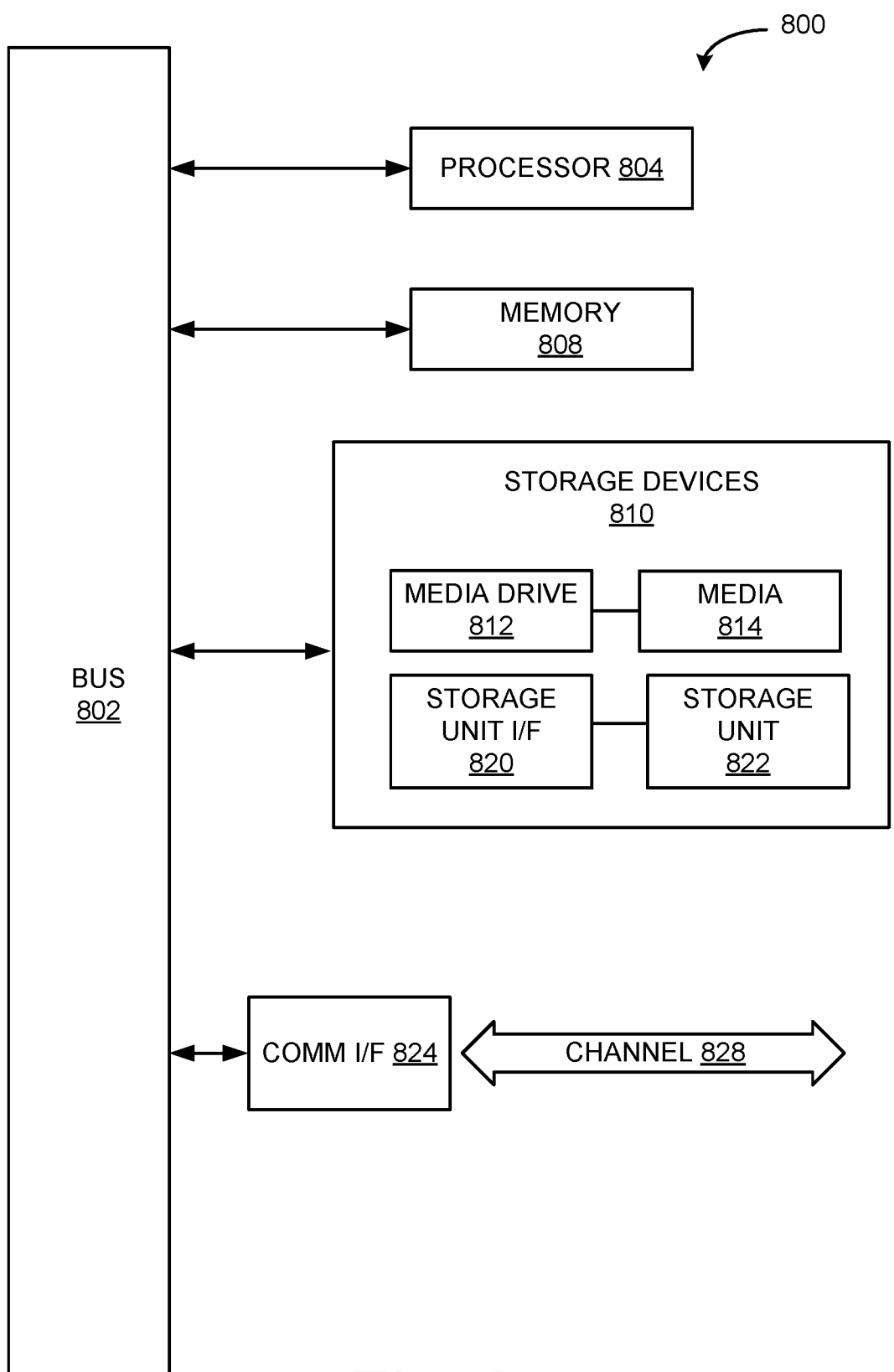
FIG. 8 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the application using other computing components or architectures.

Referring now to FIG. 8, computing component 800 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, portable computing devices, and other electronic devices that might include some form of processing capability.

Computing component 800 might include, for example, one or more processors, controllers, control components, or other processing devices. Processor 804 might be implemented using a general-purpose or special-purpose processing engine such as, for example, a microprocessor, controller, or other control logic. Processor 804 may be connected to a bus 802. However, any communication medium can be used to facilitate interaction with other components of computing component 800 or to communicate externally.

Computing component 800 might also include one or more memory components, simply referred to herein as main memory 808. For example, random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a solid-state drive, a magnetic tape drive, an optical drive, a compact disc (CD) or digital video disc (DVD) drive (R or RW), or other removable or fixed media drive might be provided. Storage media 814 might include, for example, a hard disk, an integrated circuit assembly, magnetic tape, cartridge, optical disk, a CD or DVD. Storage media 614 may be any other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot. Other examples may include a PCMCIA slot and card, and other fixed or removable storage units 822 and interfaces 820 that allow software and data to be transferred from storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 824 may be carried on signals, which can be electronic, electromagnetic (which includes optical) or other signals capable of being exchanged by a given communications interface 824. These signals might be provided to communications interface 824 via a channel 828. Channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., training data set repository 304, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
    collecting from a plurality of drivers, by a lane change modelling system, a plurality of data associated with a plurality of driver-performed lane change maneuvers;
    evaluating, by the lane change modelling system, the collected plurality of data associated with the plurality of driver-performed lane change maneuvers to determine whether any driver-performed lane change maneuvers are unsafe lane change maneuvers;
    discarding, by the lane change modelling system, from the data associated with the plurality of driver-performed lane change maneuvers, data associated with one or more driver-performed lane change maneuvers that are determined to be unsafe lane change maneuvers, resulting in filtered lane change data; and
    generating, by the lane change modelling system, using the filtered lane change data, a generic lane change model to control performance of a lane change maneuver by an autonomous driving system,
    wherein the generated generic lane change model comprises a model lane change maneuver based on the plurality of driver-performed lane change maneuvers performed by the plurality of drivers.

2. The method of claim 1, wherein collecting the plurality of data associated with a plurality of driver-performed lane change maneuvers comprises:
    receiving, by a network interface of the lane change modelling system, the plurality of data over a plurality of data streams from a plurality of connected vehicles; and
    tagging, by the lane change modelling system, a subset of the plurality of data to each of the plurality of driver-performed lane change maneuvers using an identifier.

3. The method of claim 2, wherein tagging each subset of the plurality of data associated with a plurality of driver-performed lane change maneuvers comprises one or more of adding a metadata tag to the subset, a time stamp indicating when the subset was received by the lane change modelling system, or a name of the connected vehicle from which the subset was collected by the lane change modelling system.

4. The method of claim 1, wherein discarding one or more driver-performed lane change maneuvers comprises:
   comparing a data type of a subset of the plurality of data associated with a driver-performed lane change maneuver against a respective safety threshold; and
   in response to determining the safety threshold is not met, discarding the respective driver-performed lane change maneuver.

5. The method of claim 4, further comprising, in response to determining the safety threshold is met, storing a plurality of safe driver-performed lane change maneuvers in a training data set repository of the lane change modelling system.

6. The method of claim 4, wherein each safety threshold associated with a data type comprises an associated weight, and discarding further comprises:
   in response to determining one or more safety thresholds are not met, determining whether a set of failed safety thresholds outweighs a set of met safety thresholds; and
   in response to determining the set of failed safety threshold does outweigh the set of met safety thresholds, discarding the driver-performed lane change maneuver.

7. The method of claim 1, wherein
   comparing, by the lane change modeling system, the generated generic lane change model and a legacy lane change model further comprises:
   in response to determining a deviation threshold is exceeded:
      deploying the generated generic lane change model to a plurality of connected vehicles configured to operate according to the autonomous driving system; and
      storing the deployed generic lane change model as the legacy lane change model.

8. The method of claim 7, wherein the deviation threshold comprises a number of disagreements between the generated generic lane change model and the legacy lane change model.

9. The method of claim 1, further comprising associating each of the driver-performed lane change maneuvers with an individual, a vehicle platform type, or a vehicle model type.

10. The method of claim 9, comprising:
   discarding one or more driver-performed lane change maneuvers associated with an individual, a vehicle platform type, or a vehicle model type determined to be unsafe lane change maneuvers for the associated individual, vehicle platform type, or vehicle model type; and
   generating a generic lane change model for the associated individual, vehicle platform type, or vehicle model type configured to control performance of a lane change maneuver by an autonomous driving system,
   wherein the generated generic lane change model for the associated individual, vehicle platform type, or vehicle model type comprises a model of an average lane change maneuver based on the plurality of driver-performed lane change maneuvers for the associated individual, vehicle platform type, or vehicle model type.

11. The method of claim 10, wherein discarding one or more driver-performed lane change maneuvers for the associated individual, vehicle platform type, or vehicle model type comprises:
   comparing a data type of a subset of the plurality of data associated with the driver-performed lane change maneuver for the associated individual, vehicle platform type, or vehicle model type against a respective safety threshold for the respective data type for the associated individual, vehicle platform type, or vehicle model type; and
   in response to determining the safety threshold is not met, discarding the respective driver-performed lane change maneuver for the associated individual, vehicle platform type, or vehicle model type.

12. The method of claim 11, wherein, in response to determining the safety threshold for the associated individual, vehicle platform type, or vehicle model type is met comprises, storing a plurality of safe driver-performed lane change maneuvers for the associated individual, vehicle platform type, or vehicle model type in a training data set repository for the associated individual, vehicle platform type, or vehicle model type of the lane change modelling system.

13. The method of claim 1, wherein the generated generic lane change model enables the autonomous driving system to determine when and how to perform a lane change based on real-time data from a plurality of vehicle sensors, vehicle systems, and vehicles cameras.

14. The method of claim 1, wherein the plurality of data associated with a driver-performed lane change maneuver comprises a plurality of vehicle data defining a scenario in which the driver-performed lane change maneuver occurred.

15. A system comprising:
   a network interface configured to communicatively couple to a plurality of connected vehicles;
   a lane change modelling system communicatively coupled to the network interface, the lane change modelling system configured to process a plurality of data associated with a plurality of driver-performed lane change maneuvers performed by a plurality of drivers and received by the network interface, and discard data of the plurality of data associated with unsafe driver-performed lane change maneuvers;
   a model controller communicatively coupled to the lane change modelling system, the model controller comprising circuitry configured to perform one or more modelling operations on the processed plurality of data associated with the plurality of driver-performed lane change maneuvers; and
   a model comparator communicatively coupled to the model controller and the network interface, the model comparator comprising circuitry configured to compare a generated generic lane change model output by the model controller and a legacy lane change model to determine whether there is a deviation in performance of the generated generic lane change model that requires an update.

16. The system of claim 15, further comprising a training data set repository communicatively coupled to the lane change modelling system, the model controller, and the model comparator, the training data set repository configured to store a plurality of training data sets and a plurality of legacy lane change models.

17. The system of claim 15, wherein the lane change modelling system comprises:
   a data tagger comprising circuitry configured to tag the plurality of data associated with the plurality of driver-performed lane change maneuvers with one or more identifiers; and a safety parser comprising circuitry configured to determine if a driver-performed lane change maneuver of the plurality of driver-performed lane change maneuvers comprises a safe maneuver and:
  in response to determining the driver-performed lane change maneuver is a safe maneuver, storing the plurality of data associated with the driver-performed lane change maneuver in the training data set repository.

18. The system of claim 15, wherein one or more of the lane change modelling system, the model controller, and the model comparator comprise a neural network.

19. A method comprising:
  collecting, by a lane change modelling system, a plurality of data associated with a plurality of driver-performed lane change maneuvers;
  evaluating, by the lane change modelling system, the collected plurality of data associated with the plurality of driver-performed lane change maneuvers to determine whether any driver-performed lane chance maneuvers are unsafe lane change maneuvers;
  discarding, by the lane change modelling system, from the data associated with the plurality of driver-performed lane change maneuvers, data associated with one or more driver-performed lane change maneuvers that are determined to be unsafe lane change maneuvers, resulting in filtered lane change data;
  generating, by the lane change modelling system, using the filtered lane change data, a generic lane change model to control performance of a lane change maneuver by an autonomous driving system;
  comparing, by the lane change modeling system, the generated generic lane change model and a legacy lane change model; and
  in response to determining a deviation threshold is exceeded:
    deploying the generated generic lane change model to a plurality of connected vehicles configured to operate according to the autonomous driving system; and
    storing the deployed generic lane change model as the legacy lane change model,
  wherein the generated generic lane change model comprises a model lane change maneuver based on the plurality of driver-performed lane change maneuvers.

20. The method of claim 19, further comprising associating each of the driver-performed lane change maneuvers with an individual, a vehicle platform type, or a vehicle model type.

* * * * *